United States Patent
Poertzgen (10) Patent No.: US 10,800,391 B2
(45) Date of Patent: Oct. 13, 2020

(54) ACTUATION DEVICE FOR A VEHICLE BRAKE

(71) Applicant: Lucas Automotive GmbH, Koblenz (DE)

(72) Inventor: Gregor Poertzgen, Koblenz (DE)

(73) Assignee: ZF Active Safety GmbH, Koblenz (DE)

(*) Notice: Subject to any disclaimer, the term of this patent is extended or adjusted under 35 U.S.C. 154(b) by 0 days.

(21) Appl. No.: 16/091,150

(22) PCT Filed: Apr. 6, 2017

(86) PCT No.: PCT/EP2017/058192
§ 371 (c)(1),
(2) Date: Oct. 4, 2018

(87) PCT Pub. No.: WO2017/174700
PCT Pub. Date: Oct. 12, 2017

(65) Prior Publication Data
US 2019/0152461 A1 May 23, 2019

(30) Foreign Application Priority Data
Apr. 7, 2016 (DE) ......................... 10 2016 004 297

(51) Int. Cl.
*B60T 13/74* (2006.01)
*F16D 65/18* (2006.01)
(Continued)

(52) U.S. Cl.
CPC ............ *B60T 13/741* (2013.01); *F16D 65/18* (2013.01); *F16D 2121/24* (2013.01); *F16D 2125/40* (2013.01); *F16D 2125/48* (2013.01)

(58) Field of Classification Search
CPC ..... F16D 55/226; B60T 13/741; B60T 13/746
(Continued)

(56) References Cited

U.S. PATENT DOCUMENTS

| 4,809,824 | A | 3/1989 | Fargier et al. |
| 8,186,488 | B2 * | 5/2012 | Poertzgen ............. B60T 13/746 188/162 |

(Continued)

FOREIGN PATENT DOCUMENTS

| DE | 10054474 C1 | 2/2002 |
| DE | 10200404048700 A1 | 5/2006 |

(Continued)

OTHER PUBLICATIONS

International Preliminary Examination Report, Application No. PCT/EP2017/058192, dated Mar. 19, 2018.

(Continued)

*Primary Examiner* — Christopher P Schwartz
(74) *Attorney, Agent, or Firm* — MacMillan, Sobanski & Todd, LLC (57) ABSTRACT

An actuation device for an electromechanically actuatable vehicle brake, comprising an electric motor, at least one multistage transmission that has at least one intermediate transmission unit and at least one output transmission unit. The rotational axis of the output transmission unit extends through the at least one output shaft section and parallel to the rotational axis of the intermediate transmission unit and the rotational axis of the electric motor. One of the rotational axes of the electric motor, the intermediate transmission unit and the output transmission unit lies outside of a plane defined by two respective rotational axes of the rotational axes of the electric motor, the intermediate transmission unit and the output transmission unit.

23 Claims, 7 Drawing Sheets

(51) Int. Cl.
*F16D 121/24* (2012.01)
*F16D 125/40* (2012.01)
*F16D 125/48* (2012.01)

(58) Field of Classification Search
USPC .................. 188/72.4, 106 R, 156–164, 73.1
See application file for complete search history.

(56) References Cited

U.S. PATENT DOCUMENTS

| | | | |
|---|---|---|---|
| 9,145,950 B2* | 9/2015 | Dettenberger | F16D 65/28 |
| 9,447,830 B2* | 9/2016 | Bull | F16D 65/18 |
| 2004/0124042 A1* | 7/2004 | Kriz, II | F16D 65/18 |
| | | | 188/162 |
| 2012/0103733 A1 | 5/2012 | Sekiguchi | |
| 2013/0203554 A1* | 8/2013 | Dettenberger | F16D 65/28 |
| | | | 475/343 |
| 2014/0034432 A1* | 2/2014 | Bull | B60T 13/741 |
| | | | 188/106 R |
| 2014/0090933 A1* | 4/2014 | Sakashita | F16D 55/226 |
| | | | 188/72.4 |
| 2017/0051801 A1 | 2/2017 | Poertzgen et al. | |

FOREIGN PATENT DOCUMENTS

| | | |
|---|---|---|
| DE | 102015204328 A1 | 9/2015 |
| JP | 2015086886 A | 5/2015 |
| WO | 2012010256 A1 | 1/2012 |
| WO | 2014029488 A1 | 2/2014 |
| WO | 2015165555 A1 | 11/2015 |

OTHER PUBLICATIONS

International Search Report and Written Opinion, Application No. PCT/EP2017/058192, dated Jun. 9, 2017.

* cited by examiner

ACTUATION DEVICE FOR A VEHICLE BRAKE

CROSS-REFERENCE TO RELATED APPLICATIONS

This application is a national stage of International Application No. PCT/EP2017/058192, filed 6 Apr. 2017, the disclosures of which are incorporated herein by reference in entirety, and which claimed priority to German Patent Application No. 10 2016 004 297.4, filed 7 Apr. 2016, the disclosures of which are incorporated herein by reference in entirety.

BACKGROUND TO THE INVENTION

The present disclosure relates generally to the technical field of actuation devices for an electromechanically actuatable vehicle brake. The present disclosure relates in particular to an actuation device which can be used for actuating an electric parking or locking brake (EPB) or an electromechanical service brake (EMB) of a motor vehicle. The present disclosure further relates to a vehicle braking system with such an actuation device.

Generic actuation devices have an electric motor and a transmission driven by the electric motor. The transmission can be coupled to a drive device, in order to generate braking and clamping forces for actuation of the brake.

Such an actuation device is known from WO 2015/165555 A1. The actuation device comprises a multistage transmission unit, which is arranged between a driving electric motor and a driven drive element of the vehicle brake. One stage of the transmission unit is formed as a cylindrical-gear transmission. Two stages of the transmission unit are coupled by means of a double gear, the rotational axis of which extends parallel to the rotational axis of the electric motor. The transmission unit has at least one intermediate stage, which is integrated into the one stage of the transmission unit formed as a cylindrical-gear transmission.

Furthermore, such actuation devices are known from WO 2012/010256 A1 and DE 10 2004 048 700 A1. These actuation devices also have a multistage transmission unit, which is arranged between a driving electric motor and a driven drive element of the vehicle brake.

Due to their constructive design, the actuation devices known from the prior art are relatively large.

SUMMARY OF THE INVENTION

An actuation device for an electromechanically actuatable vehicle brake with a compact construction and thus reduced installation space requirement is to be specified. In particular, an actuation device for an electromechanically actuatable vehicle brake is to be specified that is suitable for use in the area of a front axle of a vehicle.

The actuation device for an electromechanically actuatable vehicle brake comprises an electric motor, which has a rotational axis, for driving the actuation device and a multistage transmission, which is coupled to the electric motor so as to transmit a torque and which can be coupled to a drive device of the vehicle brake. The at least one multistage transmission has at least one intermediate transmission unit and at least one output transmission unit. The intermediate transmission unit has at least one first gear and a second gear coaxial with the first gear. The first gear and the second gear define a rotational axis of the intermediate transmission unit. The output transmission unit has at least one output shaft section, via which the output transmission unit can be coupled to the drive device of the vehicle brake. A rotational axis of the output transmission unit extends through the at least one output shaft section.

The rotational axis of the output transmission unit extends in parallel to the rotational axis of the intermediate transmission unit and to the rotational axis of the electric motor. One of the rotational axes of the electric motor, the intermediate transmission unit and the output transmission unit lies outside a plane spanned by respectively two of the rotational axes of the electric motor, the intermediate transmission unit and the output transmission unit.

The rotational axis of the electric motor and the rotational axis of the intermediate transmission unit can span a first plane. The rotational axis of the intermediate transmission unit and the rotational axis of the output transmission unit can span a second plane. The first plane and the second plane can enclose a predetermined angle between them, i.e. the first plane and the second plane can run angled at a predetermined angle to one another. The predetermined angle can be unequal to 0° and unequal to 180°. The predetermined angle can be between 60° and 170°, for example. The angle can preferably lie between 90° and 150°. The predetermined angle is fixed between a portion of the first plane between the rotational axis of the electric motor and the rotational axis of the intermediate transmission unit and a portion of the second plane between the rotational axis of the intermediate transmission unit and the rotational axis of the output transmission unit.

The intersection line of the first plane and the second plane can be one of the rotational axes of the electric motor, the intermediate transmission unit or the output unit. For example, the rotational axis of the intermediate transmission unit can correspond to the intersection line of the first plane and the second plane.

The intermediate transmission unit can be coupled directly to the output transmission unit so as to transmit a torque. The at least one first gear or the at least one gear coaxial to the first gear can be coupled directly to the output transmission unit so as to transmit a torque. The intermediate transmission unit and the output transmission unit can be arranged in close spatial proximity, so that to couple the intermediate transmission unit and the output transmission unit little installation space is required.

The intermediate transmission unit can have at least one intermediate gear. The intermediate gear can couple the intermediate transmission unit to the output transmission unit so as to transmit a torque. The rotational axis of the at least one intermediate gear can extend parallel to the rotational axes of the electric motor, the intermediate transmission unit and the output transmission unit.

The rotational axis of the at least one intermediate gear can lie in the first plane spanned by the rotational axis of the intermediate transmission unit and of the output transmission unit. The rotational axis of the at least one intermediate gear can lie in the second plane spanned by the rotational axis of the intermediate transmission unit and the output transmission unit. The rotational axis of the at least one intermediate gear can extend outside the first plane and the second plane.

The intermediate transmission unit can have two intermediate gears. The two intermediate gears can couple the intermediate transmission unit to the output transmission unit so as to transmit a torque. The rotational axes of the two intermediate gears can extend parallel to the rotational axes of the electric motor, the intermediate transmission unit and the output transmission unit.

A plane spanned by the rotational axes of the intermediate gears can extend at a predetermined angle to the first plane. The plane spanned by the rotational axes of the intermediate gears can extend perpendicular to the second plane.

The intermediate transmission unit can be formed as a cylindrical-gear transmission. The first gear and the at least one second gear of the intermediate transmission unit, which gear is arranged coaxially to the first gear, can be in the form of a double gear. This double gear can determine the rotational axis of the intermediate transmission unit.

The intermediate transmission unit can be coupleable via the first gear or the second gear coaxial to the first gear to an output gear of the electric motor. The intermediate transmission unit can be coupleable via the first gear to an output gear of the electric motor and by the second gear coaxial to the first gear to the output transmission unit. The first gear can have a larger diameter than the second gear. The first gear and the second gear can each form a transmission stage of the intermediate transmission unit or of the multistage transmission.

The first gear can engage directly with the output gear of the electric motor so as to transmit a torque. The output gear of the electric motor contacts the first gear of the intermediate transmission unit at a predetermined engagement region or at a predetermined engagement point. The rotational axis of the electric motor can be arranged so that the predetermined engagement region is arranged offset in a circumferential direction of the first gear of the intermediate transmission unit to the second plane spanned by the rotational axis of the intermediate transmission unit and the rotational axis of the output transmission unit. The predetermined engagement region or the predetermined engagement point in this case lies preferably completely outside this second plane. Due to this offset, the rotational axes of the electric motor, the intermediate transmission unit and the output transmission unit can be arranged closer to one another, which results in the electric motor, the intermediate transmission unit and the output transmission unit being able to be arranged closer to one another. To achieve a reduced distance between the rotational axis of the electric motor and the rotational axis of the output transmission unit, the position of the rotational axis of the electric motor can be fixed along the outer circumference of the first gear of the intermediate transmission unit so that the engagement region or the engagement point lies outside the second plane.

The first gear or the second gear of the intermediate transmission unit can be coupled directly or indirectly via the at least one intermediate gear to the output transmission unit. In particular, the second gear with a smaller diameter can be coupled indirectly or directly via the at least one intermediate gear to the output transmission unit. In a direct coupling the second gear of the intermediate transmission unit can engage directly or immediately with the output transmission unit so as to transmit a torque, i.e. without an intermediate gear connected in between.

The output transmission unit can have at least one cylindrical gear and at least one planetary transmission. The second gear of the intermediate transmission unit can be coupled indirectly via the at least one intermediate gear to the cylindrical gear of the output transmission unit. The second gear of the intermediate transmission unit can also engage directly with the cylindrical gear of the output transmission unit so as to transmit a torque.

The at least one cylindrical gear can be coupled to at least one sun wheel of the planetary transmission. The at least one cylindrical gear can be connected in a torque-proof manner to the sun wheel of the planetary transmission. The at least one cylindrical gear can be formed in particular in one piece with the sun wheel of the planetary transmission. The at least one cylindrical gear can be connected to the sun wheel via at least one section extending in a radial direction. The output shaft section defining the rotational axis of the output transmission unit can be provided on a planetary carrier of the planetary transmission.

The actuation device can have at least one housing. The planetary transmission can have a ring gear, which is formed in one piece with the at least one housing. Alternatively to this, the ring gear can be formed to be arranged on at least one part of the at least one housing.

Furthermore, another actuation device for an electromechanically actuatable vehicle brake is specified, which comprises an electric motor having a rotational axis for driving the actuation device and a multistage transmission. The multistage transmission can be coupled to the electric motor so as to transmit a torque and can be coupled to a drive device of the vehicle brake. The actuation device has a housing. The electric motor and the multistage transmission are taken up in the housing. The housing has a shape that is angled in cross section. The at least one multistage transmission can have at least one intermediate transmission unit and at least one output transmission unit. The intermediate transmission unit has at least one gear. The at least one gear determines a rotational axis of the intermediate transmission unit. The output transmission unit has at least one output shaft section, via which the output transmission unit can be coupled to the drive device of the vehicle brake. A rotational axis of the output transmission unit extends through the at least one output shaft section. The rotational axis of the output transmission unit extends parallel to the rotational axis of the intermediate transmission unit and to the rotational axis of the electric motor. One of the rotational axes of the electric motor, the intermediate transmission unit and the output transmission unit lies outside a plane spanned by respectively two of the rotational axes of the electric motor, the intermediate transmission unit and the output transmission unit.

The angled form of the housing can be defined by two intersecting limbs. The rotational axis of the intermediate transmission unit can be arranged in the area of an intersection point of the limbs. The two limbs of the housing can enclose a predetermined angle between them. The predetermined angle can be, for example, between 40° and 160°. The angle can preferably lie between 60° and 150°. In particular, the angle can be between 75° and 120°.

The housing can have a first receiving section for the motor and a second receiving section for the multistage transmission. The first receiving section and the second receiving section can run at an angle to one another. The first receiving section for receiving the electric motor and the second receiving section for receiving the transmission can extend at an angle to one another.

The at least one housing for receiving the electric motor, the intermediate transmission unit and the output transmission unit can be formed C- or L-shaped in cross section.

The length or the installation length of the housing of the actuation device can be substantially determined by the distance between the rotational axis of the electric motor and the rotational axis of the output transmission unit. By the arrangement of one of the rotational axes of the electric motor, the intermediate transmission unit and the output transmission unit outside the plane spanned by respectively two rotational axes of the electric motor, the intermediate transmission unit and the output transmission unit, the distance between the rotational axis of the electric motor and the rotational axis of the output transmission unit can be reduced. Since, for example, the rotational axis of the electric motor can be arranged offset to a plane spanned by the rotational axes of the intermediate transmission unit and the output transmission unit, the rotational axis of the electric motor can be arranged closer to the rotational axis of the output transmission unit. The bent or substantially C- or L-shaped design in cross section of the housing and thus a shortened installation length of the actuation device can be achieved by this.

The distance between the rotational axis of the electric motor and the rotational axis of the output transmission unit can be a function of the predetermined angle between the first plane and the second plane. It can apply, for example, that the smaller the predetermined angle between the first plane and the second plane is, the smaller the distance becomes between the rotational axis of the electric motor and the rotational axis of the output transmission unit. The installation length of the actuation device or of the housing of the actuation device can be determined by the predetermined angle between the first plane and the second plane, as the distance between the rotational axis of the electric motor and the rotational axis of the output transmission unit that determines the installation length is a function of the predetermined angle that is enclosed between the first plane and the second plane.

At least one attachment section can be provided on the housing of the actuation device for attaching the actuation device to a vehicle. The at least one attachment section can have at least one attachment opening. Due to the offset arrangement of one of the rotational axes of the electric motor, the intermediate transmission unit and the output transmission unit to a plane spanned by respectively two rotational axes of the electric motor, the intermediate transmission unit and the output transmission unit, the receiving section for the electric motor and the second receiving section for the transmission can enclose an attachment section with an attachment opening between them. Accordingly both the receiving section for the electric motor and the receiving section for the transmission can rest against the at least one attachment section with the attachment opening.

The have at least one attachment opening, which can interact with a bolt for attaching the actuation device to a vehicle. The bolt can be provided in this case fixedly on the vehicle at a predetermined attachment point. The actuation device can be put with its attachment opening onto this bolt and attached to the vehicle.

The housing can have a first housing part and a second housing part. The two receiving sections can be formed in one of the housing parts. The respectively other housing part can then be used to close the housing part formed with the receiving sections.

The planetary transmission can have a ring gear. The ring gear of the planetary transmission can be arranged on the at least one housing. In other words, the ring gear of the planetary transmission can be part of the housing.

The ring gear of the planetary transmission can be formed in one piece with the at least one housing. The number of components can be reduced thereby and the assembly of the actuation device simplified.

The actuation device can further have at least one bearing element, on which at least the transmission unit is mounted or supported. The actuation device can have a first and a second bearing element, between which at the least the rotational axes of the intermediate transmission unit and the output transmission unit extend.

Furthermore, a vehicle braking system with at least one actuation device of the type described above is specified.

A vehicle with such a vehicle braking system is also specified. The at least one actuation device can be arranged in the area of the front axle of the vehicle. Little installation space is available in the area of the front axle of a vehicle on account of the plurality of assemblies and components of a vehicle, such as e.g. engine and steering system of a vehicle, arranged in this area. Due to its space-saving construction, the actuation device is suitable for arrangement in the area of the front axle.

Other advantages of this invention will become apparent to those skilled in the art from the following detailed description of the preferred embodiments, when read in light of the accompanying drawings.

DETAILED DESCRIPTION OF THE INVENTION

Figure 1:
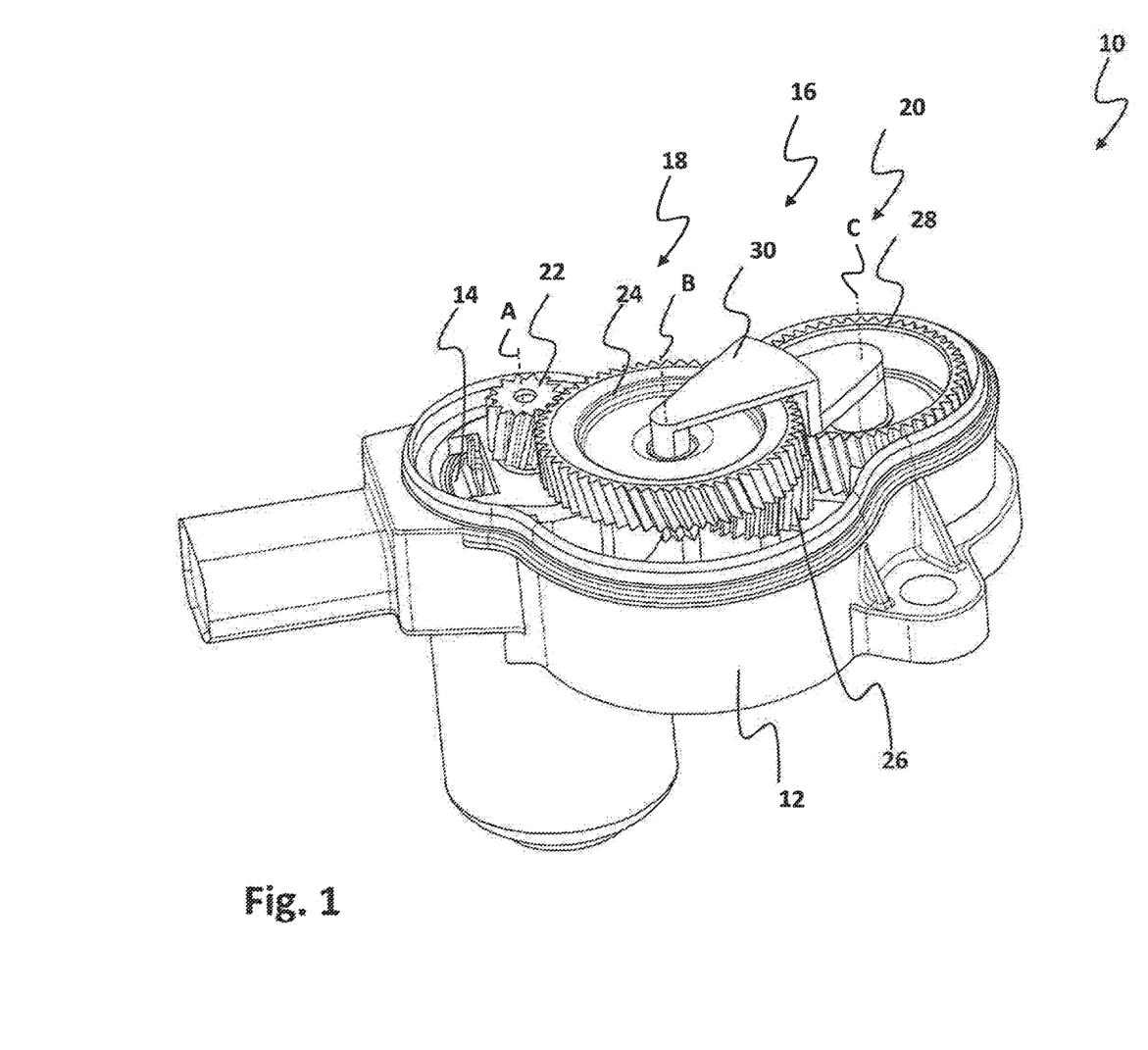
FIG. 1 is a view in perspective of an actuation device according to a first exemplary embodiment.

FIG. 1 shows a view in perspective of an actuation device for an electromechanically actuatable vehicle brake. The actuation device is generally designated 10.

The electromechanical actuation device 10 has a housing 12, into which the electric motor 14 and the transmission 16 are inserted. The transmission 16 has an intermediate transmission unit 18 and an output transmission unit 20. The transmission 16 is driven via an output gear 22 of the electric motor 14. A rotational axis A of the electric motor 14 extends through the output gear 22.

The output gear 22 of the electric motor 14 drives a gear 24 of the intermediate transmission unit 18. Apart from the gear 24, the intermediate transmission unit 18 has an intermediate gear 26, via which the intermediate transmission unit 18 is coupled to the output transmission unit 20 so as to transmit a torque. A gear 28 of the output transmission unit 20 is driven via the intermediate gear 26. The gear 24 of the intermediate transmission unit 18 and the gear 28 of the output transmission unit 20 are designed in the form of cylindrical gears.

The intermediate transmission unit 18 has a rotational axis B and the output transmission unit 20 has a rotational axis C. The rotational axis A of the electric motor 14 and the rotational axes B and C of the intermediate transmission unit 18 and of the output transmission unit 20 run parallel to one another.

The gears 24 and 28 are held by a bearing element 30 or are supported on this bearing element 30. The bearing element 30 extends in a stepped manner from the gear 24 of the intermediate transmission unit 18 to the gear 28 of the output transmission unit 20. Shafts of said gears, which shafts are not shown in FIG. 1, can be arranged on the bearing element 30.

Figure 2:
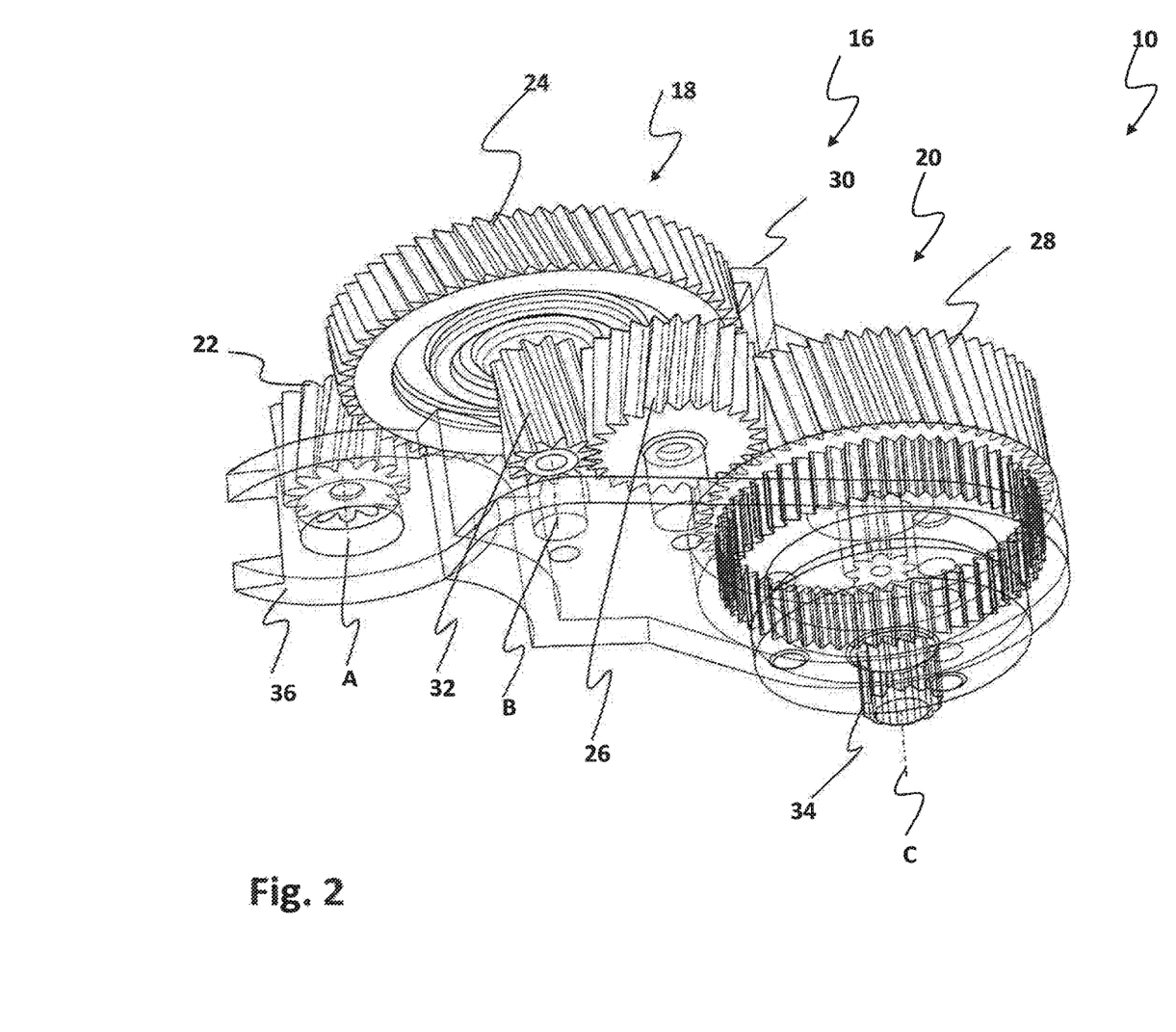
FIG. 2 is another view in perspective of the actuation device according to the first exemplary embodiment.

FIG. 2 shows another view in perspective of the actuation device 10. As revealed by FIG. 2, the intermediate transmission unit 18 has another gear 32 as well as the gear 24. The gear 32 has a smaller diameter than the gear 24. The gear 32 is arranged coaxially with the gear 24. The coaxial gears 24, 32 are coupled to one another in a torque-proof manner and accordingly form a double gear 24, 32, which rotates about the rotational axis B. The rotational axis B is the rotational axis of the intermediate transmission unit 18, which is determined by the coaxial gears 24, 32. The gear 32 drives the intermediate gear 26, which is coupled to the gear 28 of the output transmission unit 20 so as to transmit a torque. Apart from the gear 28 the output transmission unit 20 has an output shaft section 34, through which the rotational axis C of the output transmission unit 20 extends.

Arranged between the gear 28 of the output transmission unit 20 and the output shaft section 34 is a planetary transmission, which is not shown in FIG. 2 and couples the gear 28 to the output shaft section 34 so as to transmit a torque. The output shaft section 34 is driven via the planetary transmission. The output shaft section 34 in turn drives a nut/spindle unit, likewise not shown, which converts the rotational movement produced by the transmission 16 into a translatory movement to actuate the brake.

Apart from the bearing element 30, the actuation device 10 has another bearing element 36. The bearing elements 30, 36 are used to hold or support the intermediate transmission unit 18 and the output transmission unit 20 as well as the electric motor 14. The bearing element 36 has a bent or angled shape in order to be able to hold or support the electric motor 14, the intermediate transmission unit 18 and the output transmission unit.

It is recognisable in FIG. 2 that the gears 24, 32 form a cylindrical-gear transmission. The double gear 24, 32 represents two stages of the intermediate transmission unit 18 and of the multistage transmission 16. The first stage is formed by the gear 24 with a larger diameter and the second stage by the gear 32 with a smaller diameter.

Figure 3:
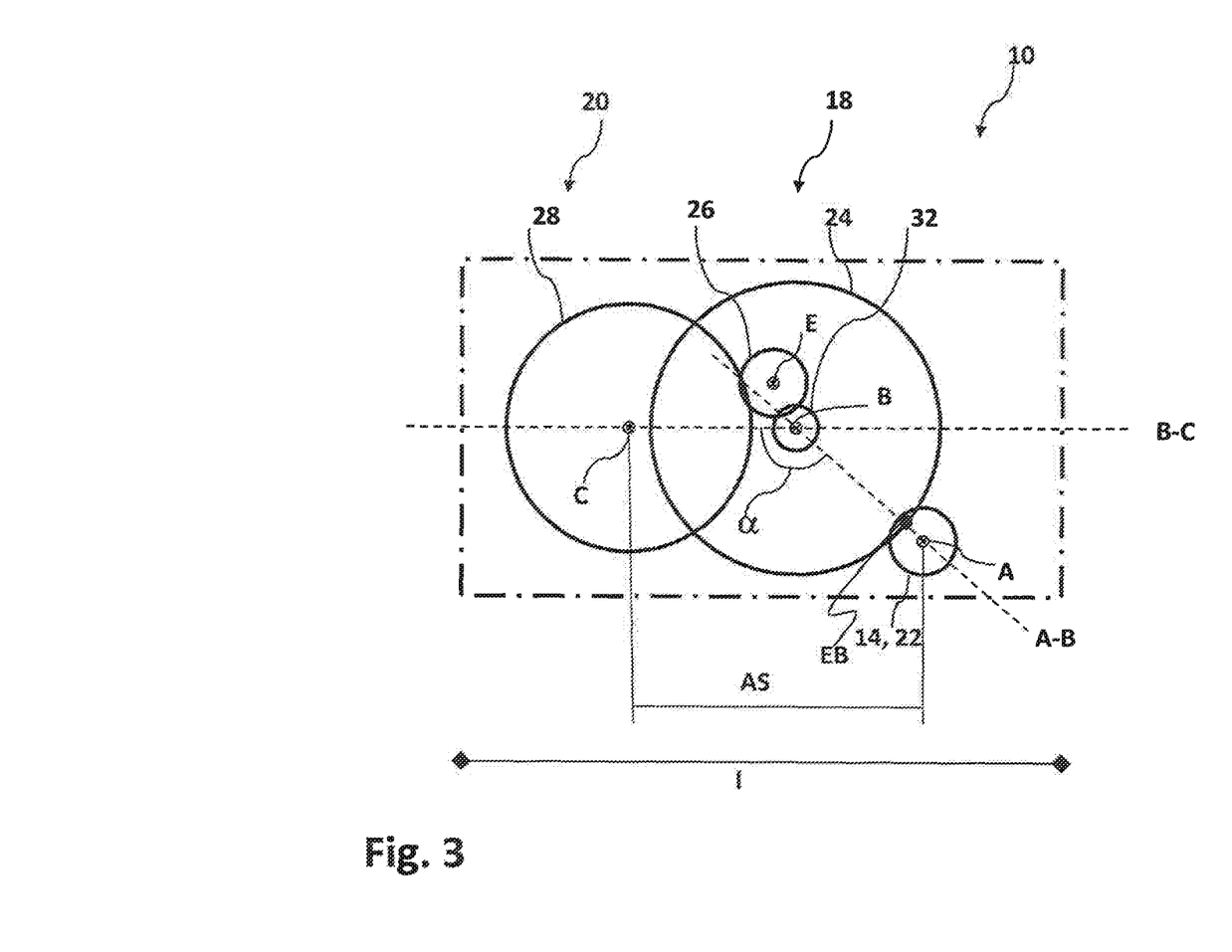
FIG. 3 is a schematic view of the actuation device according to the first exemplary embodiment.

FIG. 3 shows a schematic view of the actuation device 10 according to the first exemplary embodiment. The output gear 22 of the electric motor 14 is shown in FIG. 3, through which gear the rotational axis A of the electric motor 14 extends. The output gear 22 of the electric motor 14 drives the gear 24 of the intermediate transmission unit 18. From the gear 24 the torque is transmitted to the gear 32 with a smaller diameter. The gears 24 and 32 of the intermediate transmission unit 18 are arranged coaxially and determine the rotational axis B of the intermediate transmission unit 18, i.e. the gears 24, 32 rotate about the rotational axis B of the intermediate transmission unit 18.

The gear 32 drives the intermediate gear 26. The intermediate gear 26 has a rotational axis E. The intermediate gear 26 drives the output transmission unit 20. To do this, the intermediate gear 26 engages with the gear 28 of the output transmission unit 20 so as to transmit a torque. The output transmission unit 20 has the rotational axis C.

The rotational axis A of the electric motor 14 and the rotational axis B of the intermediate transmission unit 18 span a first plane A-B. The rotational axis B of the intermediate transmission unit 18 and the rotational axis C of the output transmission unit 20 span a second plane B-C.

The first plane A-B runs at an angle to the second plane B-C. The first plane A-B and the second plane B-C enclose a predetermined angle α between them. The angle α is unequal to 0° and unequal to 180°. The angle α can be, for example, between 60° and 170°. The angle α can be 135°, for example. The angle α is determined between the section of the first plane A-B between the rotational axis A of the electric motor 14 and the rotational axis B of the intermediate transmission unit 18 and the section of the second plane B-C between the rotational axis B and the rotational axis C of the output transmission unit 20.

The output gear 22 of the electric motor 14 engages with the gear 24 so as to transmit a torque. Here the output gear 22 of the electric motor 14 contacts the gear 24 of the intermediate transmission unit 18 at a predetermined engagement region EB or engagement point EB. The rotational axis A of the electric motor 14 is arranged so that the predetermined engagement region EB or the predetermined engagement point EB lies completely outside the second plane B-C, which is spanned by the rotational axes B and C of the intermediate transmission unit and the output transmission unit 20. Since the rotational axis A of the electric motor 14 is offset to the second plane B-C in the circumferential direction of the first gear 24, the engagement region EB or the predetermined engagement point EB is offset in the circumferential direction of the first gear 24 along the outer circumference of the gear 24 to the second plane B-C. Due to the offset of the rotational axis A of the electric motor 14 to the second plane B-C, the rotational axis A of the electric motor 14 and thus also the electric motor 14 can be arranged closer to the rotational axes B and C of the intermediate transmission unit 18 and the output transmission unit 20.

The installation length l of the actuation device 10 is substantially determined by the distance AS between the rotational axis A of the electric motor 14 and the rotational axis C of the output transmission unit 20. The distance AS is determined parallel to the second plane B-C. Due to the angled progression of the first plane A-B to the second plane B-C, the distance AS between the rotational axis A of the electric motor 14 and the rotational axis C of the intermediate transmission unit 18 is reduced, due to which a compact construction of the actuation device 10 is achieved. Due to this compact construction, the actuation device C is particularly suitable for use on the front axle of a vehicle. The distance AS is determined by the angle α, which the first plane A-B and the second plane B-C enclose between them. The installation length l of the actuation device 10 is thus also a function of the angle α. The smaller the angle α, the smaller the distance AS between the rotational axis A of the electric motor 14 and the rotational axis C of the output transmission unit 20 and thus the installation length l of the actuation device 10.

In the exemplary embodiment according to FIG. 3, the intermediate gear 26 is provided above the second plane B-C, i.e. the rotational axis E of the intermediate gear 26 is located on the side of the second plane B-C facing away from the rotational axis A of the electric motor 14.

Figure 4:
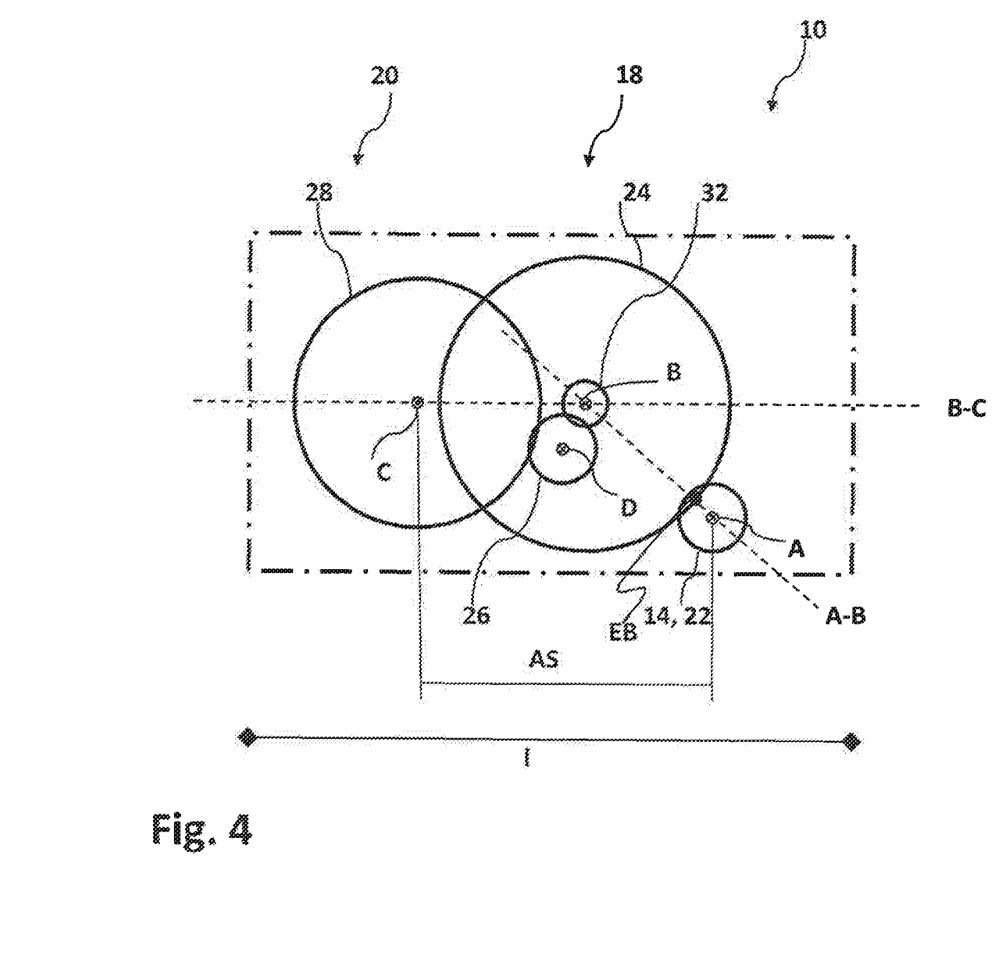
FIG. 4 is a schematic view of an actuation device according to a second exemplary embodiment.

FIG. 4 shows a schematic view of an actuation device according to a second exemplary embodiment. The construction of the actuation device 10 according to the exemplary embodiment shown in FIG. 4 largely corresponds to the construction described above of the exemplary embodiment according to FIG. 3. The angle α is not included in FIG. 4 for reasons of clarity. However, the first plane A-B and the second plane B-C run at a predetermined angle to one another also in the exemplary embodiment according to FIG. 4.

The only substantial difference consists in the fact that the intermediate gear 26 is arranged in a vertical direction below the second plane B-C. In other words, the intermediate gear 26 with its rotational axis E is located in this exemplary embodiment on the side of the plane B-C on which the rotational axis A of the electric motor 14 is located.

Figure 5:
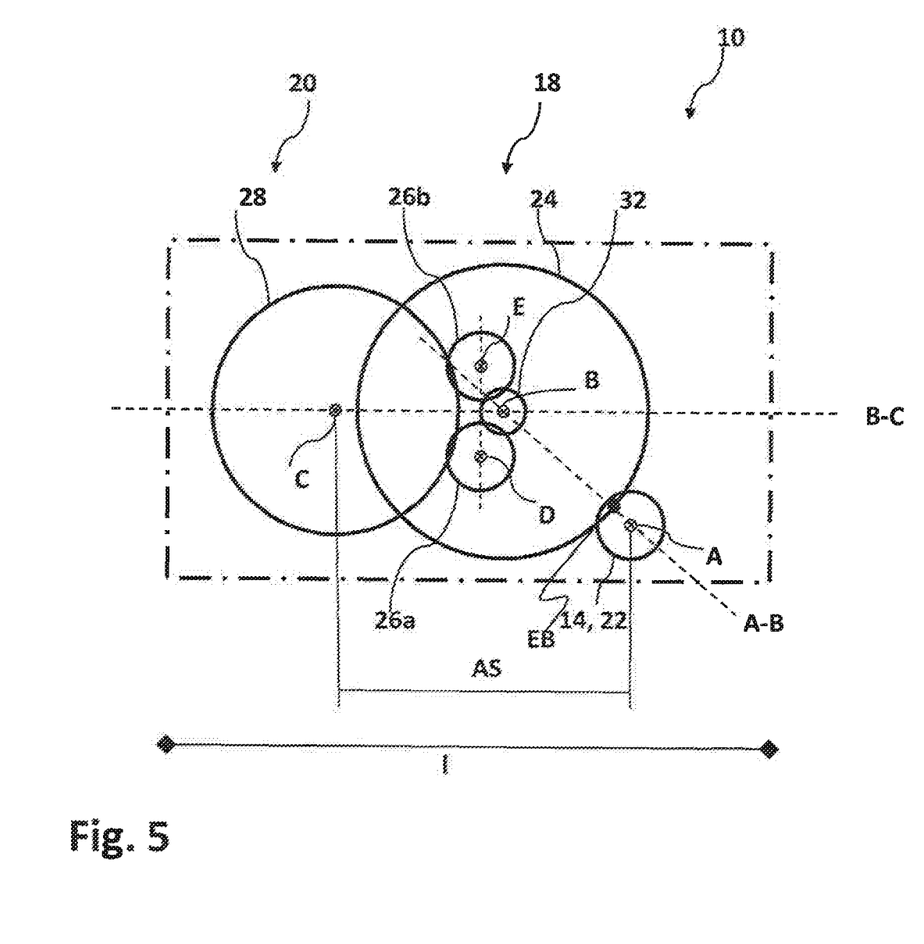
FIG. 5 is a schematic view of an actuation device according to a third exemplary embodiment.

FIG. 5 shows a schematic view of a third exemplary embodiment of the actuation device 10. The arrangement of the rotational axes A, B and C of the electric motor 14, the intermediate transmission unit 18 and the output transmission unit 20 corresponds to the arrangement described above with reference to FIGS. 3 and 4. For reasons of clarity, the angle α is not drawn in also in FIG. 5. The first plane A-B and the second plane B-C run at a predetermined angle to one another in the exemplary embodiment according to FIG. 5 also.

The actuation device 10 according to the exemplary embodiment shown in FIG. 5 has two intermediate gears 26a and 26b. The intermediate gears 26a, 26b each have a rotational axis D, E, The rotational axes D, E of the intermediate gears 26a and 26b span a plane D-E. The plane D-E of the rotational axes D, E of the intermediate gears 26a, 26b runs perpendicular to the second plane B-C and at an angle to the first plane A-B.

Even with an arrangement of two intermediate gears 26a, 26b, the actuation device 10 has a compact construction.

Figure 6:
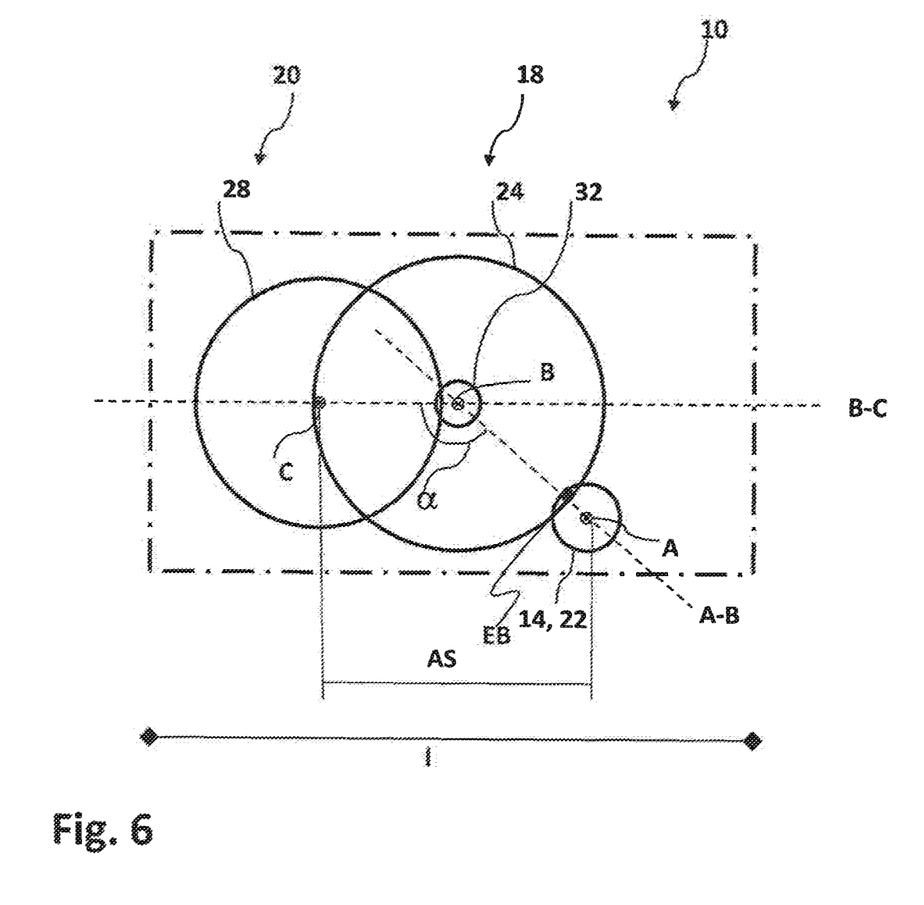
FIG. 6 is a schematic view of an actuation device according to a fourth exemplary embodiment.

FIG. 6 shows a schematic view of an actuation device 10 according to a fourth exemplary embodiment of the invention. In the exemplary embodiment according to FIG. 6, no intermediate gear is provided. The intermediate transmission unit 18 rests directly via the gear 32 with a smaller diameter on the output transmission unit 20 and its gear 28. The gear 32 of the intermediate transmission unit 18 engages directly and immediately with the gear 28 of the output transmission unit 20 so as to transmit a torque.

The arrangement of the rotational axes A of the electric motor 14, B of the intermediate transmission unit 18 and C of the output transmission unit 20 corresponds to the arrangement described above. The first plane A-B runs at an angle to the second plane B-C. The planes A-B and B-C enclose a predetermined angle α between them. The angle α is unequal to 0° and unequal to 180°. Since the exemplary embodiment according to FIG. 9 has no intermediate gears, a very compact construction can be achieved.

Figures 7, 8, 9:
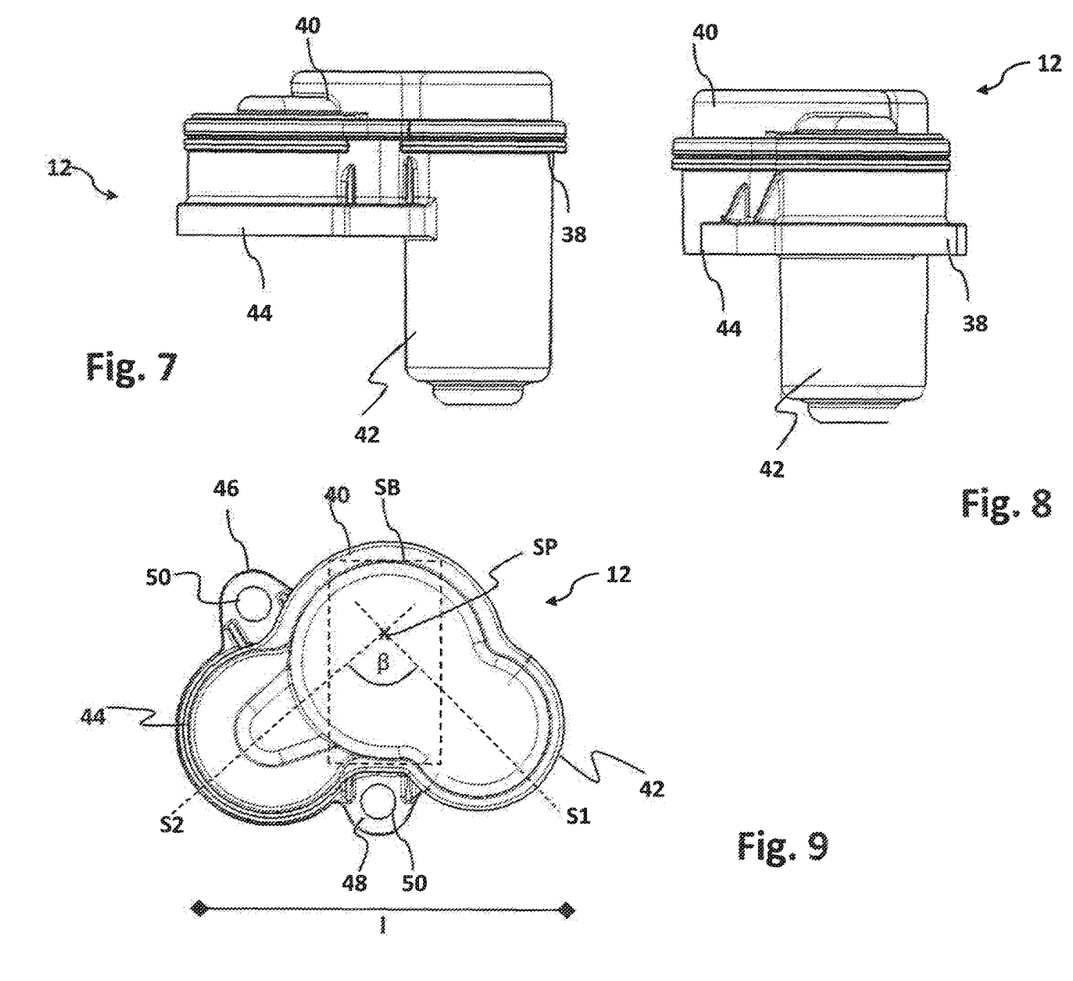
FIGS. 7 to 9 are views of a housing of the actuation device.

FIGS. 7 to 9 show views of the housing 12 of the actuation device 10 according to one of the exemplary embodiments described here. The housing 12 serves to receive the transmission and the electric motor, neither of which are shown in FIGS. 7 to 9. The housing 12 has two housing parts 38 and 40. Formed in the housing part 38 are a first receiving section 42 for receiving the electric motor and a second receiving section 44, which is used to receive the transmission. The housing part 40 forms a closing element for closing off the housing 12.

The receiving section 42 for receiving the electric motor and the receiving section 44 for receiving the transmission extend at an angle to one another. The receiving section 42 is formed in limb S1 and the receiving section 44 is formed in limb S2 of the housing 12. For visualisation purposes the limbs S1 and S2 are shown by dashed lines in FIG. 9. The limbs S1 and S2 intersect in a region SB or in an intersection point SP within this region SB. The limbs S1 and S2 enclose a predetermined angle β between them. The rotational axis of the intermediate transmission unit, which is not drawn in FIG. 9, can be arranged in the intersection region SB. Due to the angled arrangement of the receiving sections 42 and 44 and due to the intersecting limbs S1 and S2, a bent or angled shape of the housing 12 is achieved, which can be described as C- or L-shaped in cross section. The C- or L-shaped design of the housing 12 is recognisable in FIG. 9 in particular. Due to this shape the housing 12 has a compact construction, which takes up little installation space. The actuation device 10 thus has a small installation length 1.

Attachment sections 46, 48 are further provided on the housing 12, which sections each have an attachment opening 50. The attachment sections 46, 48 are used to mount the actuation device 10 on a vehicle. The receiving section 42 and the receiving section 44 enclose the attachment section 48 between them. On account of the angled arrangement of the receiving sections 42 and 44, the two receiving sections 42 and 44 rest against the attachment section 48. The components of the actuation device 10 that are received in the receiving sections 42 and 44 are arranged close to the attachment sections 46 and 48, so the actuation device 10 with its attachment sections 46 and 48 takes up little space.

Due to the offset arrangement of the rotational axes of the electric motor, the intermediate transmission unit and the output transmission unit that is illustrated with reference to the exemplary embodiments, a compact construction of the actuation device can be achieved that takes up little installation space. In the area of the front axle of a vehicle, relatively little installation space is available, particularly compared with the rear axle of a vehicle. A plurality of components is arranged in the area of the front axle or on the front axle in a vehicle. Such components can be, for example, the engine, elements and assemblies connected to the engine or devices related to the steering, such as the steering column and similar, for example. With its compact construction taking up little space, the actuation device is suitable in particular for use in the area of the front axle.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An actuation device for an electromechanically actuatable vehicle brake, comprising
an electric motor for driving the actuation device, wherein the electric motor has a rotational axis,
a multistage transmission, which is coupled to the electric motor so as to transmit a torque and is configured to be coupled to a drive device of the vehicle brake,
at least one housing, in which the electric motor and the multistage transmission are received, wherein the housing has a shape that is angled in cross section, wherein
the at least one multistage transmission has at least one intermediate transmission unit and at least one output transmission unit, wherein
the intermediate transmission unit has at least one gear, wherein the at least one gear defines a rotational axis of the intermediate transmission unit, wherein
the output transmission unit has at least one output shaft section, via which the output transmission unit is configured to be coupled to the drive device of the vehicle brake, wherein
a rotational axis of the output transmission unit extends through the at least one output shaft section, wherein
the rotational axis of the output transmission unit extends in parallel to the rotational axis of the intermediate transmission unit and to the rotational axis of the electric motor and one of the rotational axes of the electric motor, the intermediate transmission unit and the output transmission unit lies outside a plane spanned by respectively two of the rotational axes of the electric motor, the intermediate transmission unit and the output transmission unit, wherein the angled shape of the housing includes a first receiving section for receiving the electric motor and a second receiving section for receiving the output transmission unit which extend at an angle relative to one another, and wherein the first receiving section is formed in a first limb of the housing, the second receiving section is formed in a second limb of the housing and the rotational axis of the intermediate transmission unit is arranged in the region of an intersection point of the first and second limbs of the housing.

2. The actuation device according to claim 1, wherein the intermediate transmission unit has at least one intermediate gear, which couples the intermediate transmission unit to the output transmission unit so as to transmit a torque, wherein the at least one intermediate gear has a rotational axis.

3. The actuation device according to claim 2, wherein the rotational axis of the at least one intermediate gear lies in a first plane spanned by the rotational axes of the electric motor and the intermediate transmission unit.

4. The actuation device according to claim 2, wherein the rotational axis of the at least one intermediate gear lies in a second plane spanned by the rotational axes of the intermediate transmission unit and the output transmission unit.

5. The actuation device according to claim 2, wherein the rotational axis of the at least one intermediate gear extends outside a first plane spanned by the rotational axes of the electric motor and the intermediate transmission unit and the or a second plane spanned by the rotational axes of the intermediate transmission unit and the output transmission unit.

6. The actuation device according to claim 2, wherein the intermediate transmission unit has two intermediate gears, which couple the intermediate transmission unit to the output transmission unit so as to transmit a torque.

7. The actuation device according to claim 6, wherein a plane spanned by the rotational axes of the intermediate gears extends at a predetermined angle to a first plane and perpendicular to a second plane.

8. The actuation device according to claim 1, wherein the output transmission unit has at least one cylindrical gear and at least one planetary transmission.

9. The actuation device according to claim 8, wherein the at least one cylindrical gear is coupled to a sun wheel of the planetary transmission.

10. The actuation device according to claim 8, wherein the output shaft section defining the rotational axis of the output transmission unit is provided on a planetary carrier of the planetary transmission.

11. The actuation device according to claim 8, wherein the planetary transmission has a ring gear and the ring gear of the planetary transmission is formed to be arranged on at least a part of a housing of the actuation device.

12. The actuation device according to claim 8, wherein the ring gear of the planetary transmission is formed in one piece with the at least one housing.

13. The actuation device according to according to claim 1, wherein the intermediate transmission unit is formed as a cylindrical-gear transmission and a first gear and a second gear of the intermediate transmission unit form a double gear, which determines the rotational axis of the intermediate transmission unit.

14. The actuation device according to claim 13, wherein the double gear of the intermediate transmission unit is configured to couple the intermediate transmission unit to an output gear of the electric motor and to the output transmission unit.

15. The actuation device according to claim 14, wherein the double gear can be coupled directly or indirectly via the at least one intermediate gear to the output transmission unit.

16. The actuation device according to claim 1, wherein the rotational axis of the electric motor and the rotational axis of the intermediate transmission unit span a first plane, wherein the rotational axis of the intermediate transmission unit and the rotational axis of the output transmission unit span a second plane, wherein the first plane and the second plane enclose a predetermined angle between them.

17. The actuation device according to claim 16, wherein the predetermined angle is unequal to 0° and unequal to 180°.

18. The actuation device according to claim 1, wherein the at least one first gear or at least one second gear coaxial with the first gear is coupled directly to the output transmission unit so as to transmit a torque.

19. The actuation device according to claim 1, wherein the intermediate transmission unit has at least a first gear and a second gear coaxial with the first gear, wherein the first gear and the second gear determine the rotational axis of the intermediate transmission unit.

20. The actuation device according to claim 1, wherein the at least one housing for receiving the electric motor, the intermediate transmission unit and the output transmission unit is formed substantially C- or L-shaped in cross section.

21. The actuation device according to claim 1, wherein the at least one housing has a first receiving section for the electric motor and a second receiving section for the multistage transmission, wherein the first receiving section runs at an angle to the second receiving section.

22. The actuation device according to claim 1, wherein the actuation device has at least one attachment section for attaching the actuation device to a vehicle.

23. A vehicle braking system with at least one actuation device according to claim 1, wherein the at least one actuation device is arranged in the area of a front axle of the vehicle.

* * * * *